Patented Apr. 25, 1933

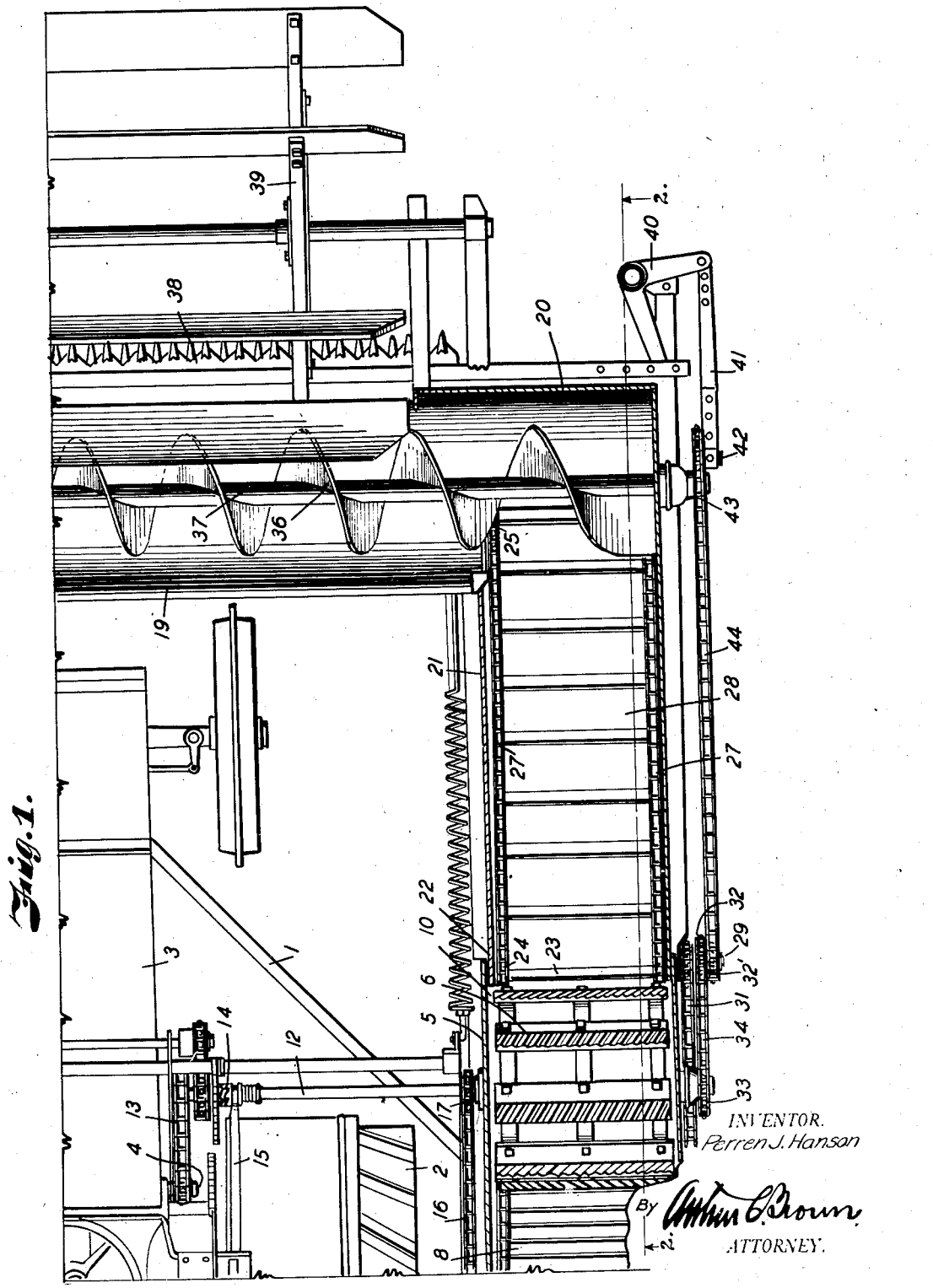

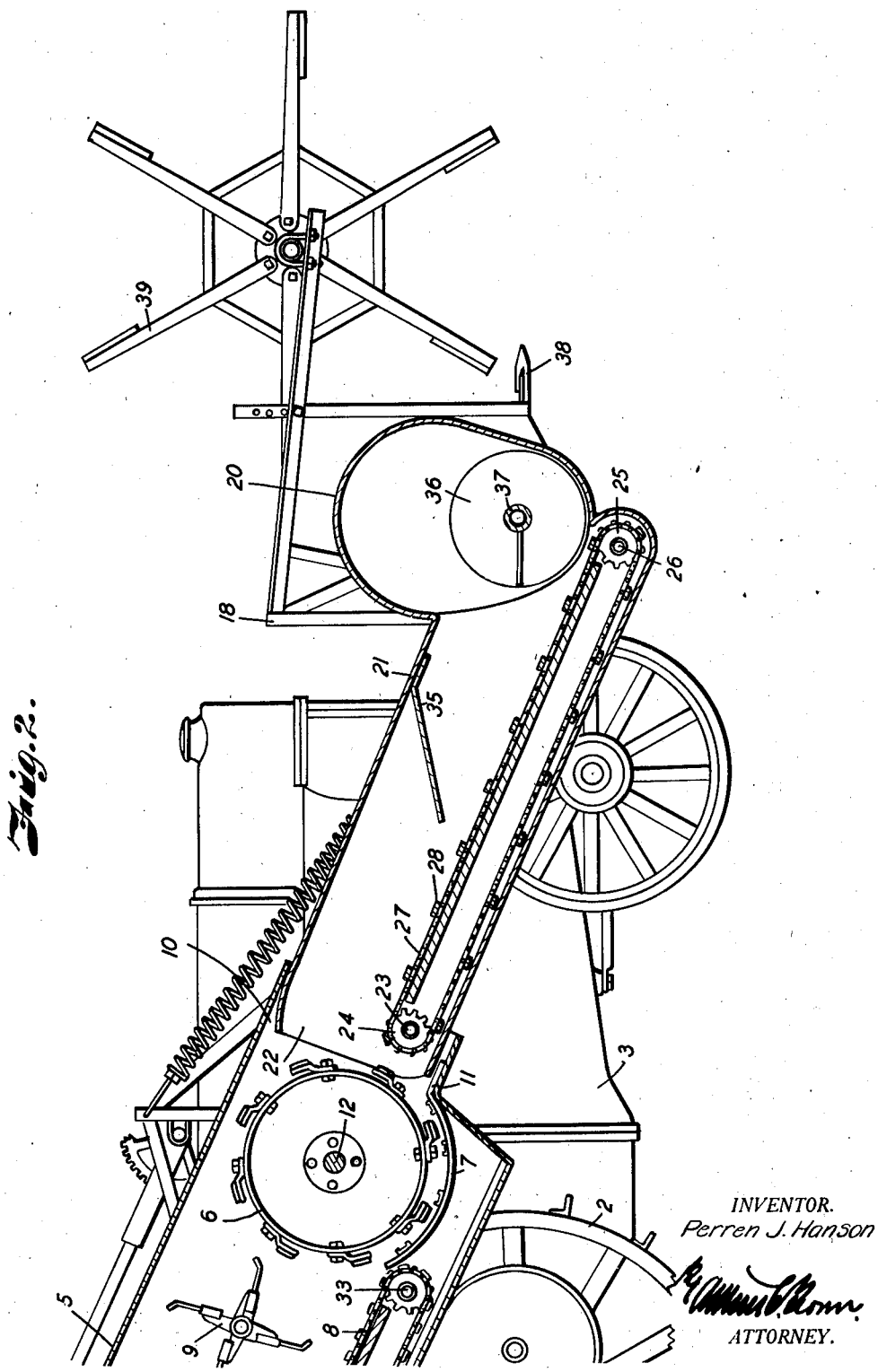

1,905,091

UNITED STATES PATENT OFFICE

PERREN J. HANSON, OF INDEPENDENCE, MISSOURI, ASSIGNOR, BY MESNE ASSIGNMENTS, TO GLEANER HARVESTER CORPORATION, OF INDEPENDENCE, MISSOURI, A CORPORATION OF DELAWARE

COMBINED HARVESTER, THRESHER, AND SEPARATOR

Application filed April 28, 1930. Serial No. 448,072.

My invention relates to combined harvesting, threshing and separating machines of the type generally designated as combines more fully disclosed in Letters Patent No. 1,702,323, to Clarence A. Stevens et al., and has for its principal object to so arrange the working parts of such a machine as to effectively balance the weight of the parts and avoid strains on the supporting elements without interfering with flow of grain through the machine.

In accomplishing this object I have provided improved details of structure and combination, the preferred form of which is illustrated in the accompanying drawings, wherein:

Fig. 1 is a plan view of the forward portion of a combine embodying my improvements, parts being broken away or removed for better illustration.

Fig. 2 is a longitudinal vertical section on the line 2—2, Fig. 1.

Referring more in detail to the drawings:

1 designates the main frame of the combine, here shown as supported on the ground wheel 2 and on a propelling tractor 3, having a take-off shaft 4 for supplying power for driving the operating parts of the machine as presently described.

Mounted on the main frame 1 is a longitudinal housing 5 for separator mechanism (not shown), and thresher mechanism including the cylinder 6 with its concave 7, a raddle 8 leading from the threshing cylinder to the separator mechanism, and a beater 9 of usual type; the cylinder 6 being located in the upper forward portion of the housing adjacent an intake opening 10, through which the lip 11 of the concave 7 is preferably projected to insure delivery of cut grain to the cylinder as presently described.

The cylinder shaft 12 is journalled in the sides of the housing 5 and an extended portion thereof is operatively connected with the power take-off shaft 4 through a sprocket and chain drive 13, clutch mechanism 14 being located in the shaft to provide control of operation of the threshing cylinder through a lever 15 extended to adjacent the driver's seat (not shown). The separator mechanism is operated through a driving belt 16 running over a sprocket 17 on the cylinder shaft 12.

18 designates a sub-frame tiltably mounted on the main frame as presently described, and including a transverse conveyor pan 19 terminating at its discharge end in a feeder housing 20 opening to a longitudinal housing 21, the rear end 22 of which projects into the opening 10 of the thresher and separator housing 5 on the main frame in discharging relation to the threshing cylinder and its concave; such rear end of the housing 21 being pivotally connected with the forward end of the housing 5 through a shaft 23 serving as part of the means for tiltably mounting the sub-frame on the main frame.

The shaft 23 carries sprockets 24 within the housing 21, and run over said sprockets and over sprockets 25 on a shaft 26 journalled in the sides of the housing 21 adjacent the forward end thereof are the chains 27 of a belt conveyor or raddle 28 for conducting cut grain from the feeder housing to the thresher housing. The shaft 23 has an extension 29 fitted with a sprocket 30 operably connected with the separator mechanism by a chain belt 31.

Located on the shaft extension 29 are sprockets 32 and 32' secured together and freely rotatable on the shaft, the sprocket 32 being connected with a sprocket 33 on the cylinder shaft 12 by a belt 34.

A rearwardly and downwardly inclined plate 35 in the housing 21 serves to retain the cut grain in feeding contact with the raddle 28 and prevent bunching at the outlet end of the housing.

Located within the grain pan 19 is a conveyor 36, preferably of the screw type illustrated, having a shaft 37 journalled in the ends of the pan and of the feeder housing 20 for conducting grain cut by the sickle 38 and fed to the pan by the reel 39 from the pan into the housing 21. The reel may be driven from the power take-off shaft of the tractor through any suitable mechanism (not shown), and the sickle is reciprocated by a bell crank 40 connected by a link 41 with an eccentric pin 42 on a sprocket 43 on an extension of the conveyor shaft 37. A chain belt 44 run over the sprocket 43 and over the sprocket 32' on the shaft 23 furnishes power for operation of the conveyor and sickle.

The combination of elements above described permits location of the threshing cylinder on the main frame where it may have solid mounting, and extension of the housing 21 from the feeder housing on the sub-frame into the end of the thresher housing permits effective delivery of cut grain from the feeder housing into the thresher housing without interference with the pivotal movement of the sub-frame for adjusting the harvesting elements to height of the standing grain.

While I have illustrated and described a specific form of traction and power means, I do not wish to be understood as limiting myself thereto as the combine may be moved through the field and the working parts operated by any suitable power element or elements.

What I claim and desire to secure by Letters Patent is:

1. In a machine of the character described including a main frame and a separating mechanism on the main frame, a substructure adjustably supported from the main frame including a transverse conveyor housing, an interconnected longitudinal raddle housing communicating the transverse housing with the separator mechanism, a raddle in the longitudinal housing for delivering grain to the separator mechanism, and a screw conveyor in the transverse housing extending across the width of the raddle and arranged so that flights thereof move over the upper surface of the raddle for discharging grain substantially uniformly across the width of said raddle.

2. In a machine of the character described including a main frame and a separator mechanism on the main frame, a substructure adjustably supported on the main frame including a transverse conveyor housing and longitudinal raddle housing communicating the transverse housing with the separator mechanism, an endless raddle in the longitudinal housing having its upper run arranged for delivering grain to the separating mechanism, and a screw conveyor in the transverse housing extending over the delivery conveyor and arranged so that flighting thereof distributes grain uniformly across the width of the upper run of said raddle.

3. In a machine of the character described including a main frame and a separator mechanism on the main frame, a substructure adjustably supported on the main frame including a transverse conveyor housing and a longitudinal raddle housing communicating the transverse conveyor housing with the separator mechanism, an endless raddle in the longitudinal housing having the upper run thereof arranged for delivering grain to the separating mechanism, a screw conveyor in the transverse housing extending across the width of the delivery conveyor having flighting for conveying and uniformly discharging grain across the upper run of said raddle, and means in the longitudinal housing for retaining the grain in feeding contact with the raddle.

4. In a machine of the character described, a harvesting mechanism including connected longitudinal and transverse housings, a delivery raddle operable in the longitudinal housing to deliver grain therethrough, a screw conveyor operable in the transverse housing and extending across the width of the delivery raddle for discharging grain across the width thereof, and means associated with the longitudinal housing for retaining the grain in feeding contact with said delivery raddle.

In testimony whereof I affix my signature.

PERREN J. HANSON.